(12) United States Patent
Krieger et al.

(10) Patent No.: US 6,781,824 B2
(45) Date of Patent: Aug. 24, 2004

(54) ENCASEMENT FOR HANDHELD COMPUTER

(75) Inventors: John William Krieger, Oxnard, CA (US); Randall Clark Lewis, Simi Valley, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 10/158,335

(22) Filed: May 30, 2002

(65) Prior Publication Data

US 2003/0142470 A1 Jul. 31, 2003

Related U.S. Application Data

(60) Provisional application No. 60/352,785, filed on Jan. 29, 2002.

(51) Int. Cl.[7] .................................................. G06F 1/16
(52) U.S. Cl. .......................... 361/683; 16/224; 345/156; D14/341; D14/345
(58) Field of Search ................................ 361/681–686, 361/724–727; 16/224; 345/156, 178; D14/341–346; D18/1, 2, 4, 7

(56) References Cited

U.S. PATENT DOCUMENTS

| | | | |
|---|---|---|---|
| 5,100,098 A | | 3/1992 | Hawkins |
| 5,128,829 A | | 7/1992 | Loew |
| 5,555,157 A | | 9/1996 | Moller et al. |
| 5,568,358 A | | 10/1996 | Nelson et al. |
| 5,638,257 A | | 6/1997 | Kumar et al. |
| 5,682,182 A | | 10/1997 | Tsubosaka |
| 5,737,183 A | | 4/1998 | Kobayashi et al. |
| 5,796,575 A | | 8/1998 | Podwalny et al. |
| 5,848,298 A | | 12/1998 | Steere, Jr. et al. |
| 5,996,956 A | | 12/1999 | Shawver |
| 6,034,866 A | * | 3/2000 | Nobuchi et al. ............ 361/681 |
| 6,108,200 A | | 8/2000 | Fullerton |
| 6,151,012 A | | 11/2000 | Bullister |
| 6,241,537 B1 | | 6/2001 | Tate et al. |
| 6,266,240 B1 | | 7/2001 | Urban et al. |
| 2002/0180694 A1 | * | 12/2002 | Isaacson ..................... 345/156 |
| 2003/0099094 A1 | * | 5/2003 | Coles et al. ................ 361/726 |
| 2003/0142471 A1 | * | 7/2003 | Krieger et al. ............. 361/683 |

OTHER PUBLICATIONS tDevice News: tDevice Ships Q–Pad™; Slimmest Keyboard & Case Combo for Palm™ Vx™ & Handspring™ Visor Edge™. Press release [online]. thinkDevice Company, Mar. 25, 2002 [retrieved on Jun. 3, 2002], 2 pps. Retrieved from the internet <http://www.tdevice.com/company_news.htm.>.

Products: Q–Pad for Palm Vx: Specification: Features and Benefits [online] [Retrieved on Jun. 3, 2002]. 2 pps. Retrieved from the internet: <http://www.tdevice.com/products_palmvx_spec.htm>.

Q–Pad for Handspring Visor Edge. Copyright 2002 Think Device Company, 1 p. Available through www.tdevice.com on Jun. 3, 2002.

Q–Pad for Palm Vx. Copyright 2001 Think Device Company, 1 p. Available through www.tdevice.com on Jun. 3, 2002.

* cited by examiner

*Primary Examiner*—Lisa Lea-Edmonds
(74) *Attorney, Agent, or Firm*—Foley & Lardner LLP

(57) ABSTRACT

A handheld computer comprises a generally rectangular housing and a cover movably connected thereto by a hinge assembly. The hinge assembly includes a tubular member or arm that has one end fixedly (non-rotatably) secured to an edge of the cover and an opposite end pivotally coupled to an edge of the cover. The hinge assembly enables the cover to be moved to at least three different positions. The cover provides a different function in each position. A method of reconfiguring an encasement of a handheld computer to provide at least two different functions includes rotating the cover about at least two different axes to move the cover between at least two different positions. The cover provides a different function in each position

39 Claims, 12 Drawing Sheets

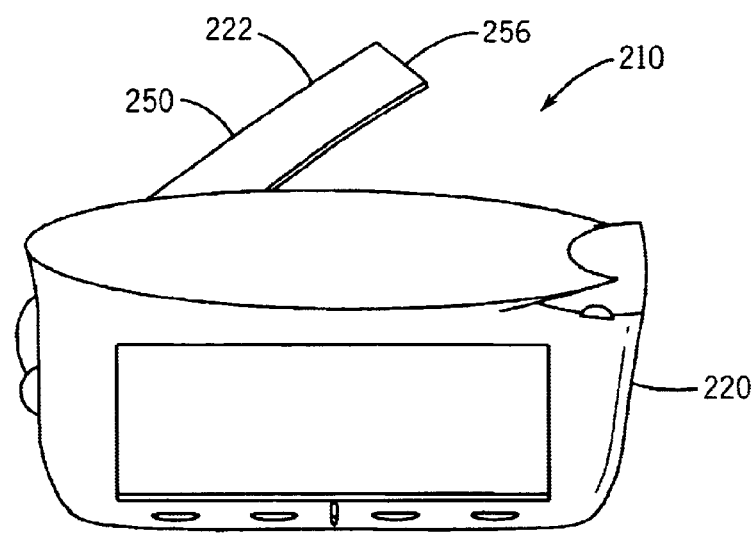
FIG. 11
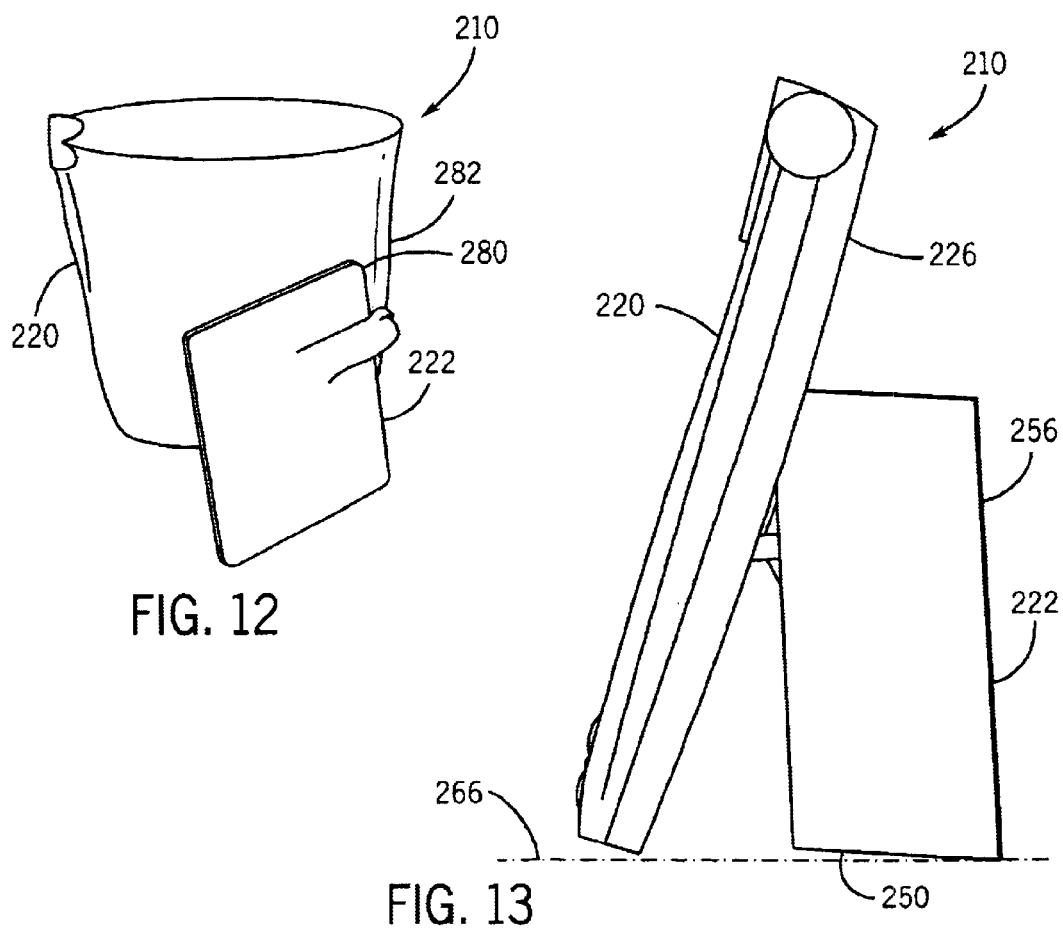
FIG. 12
FIG. 13

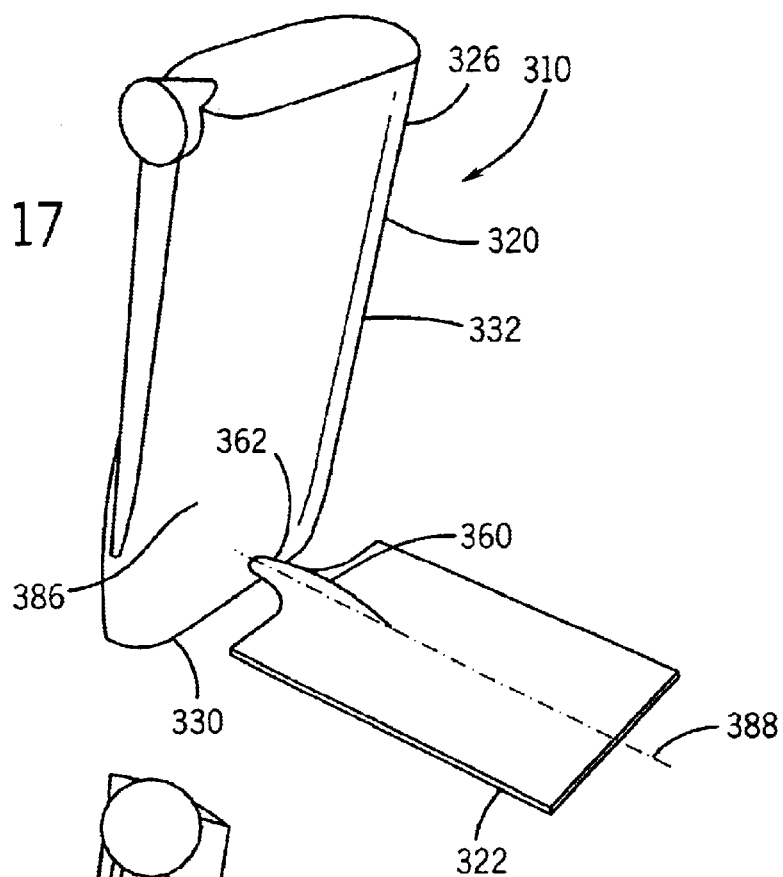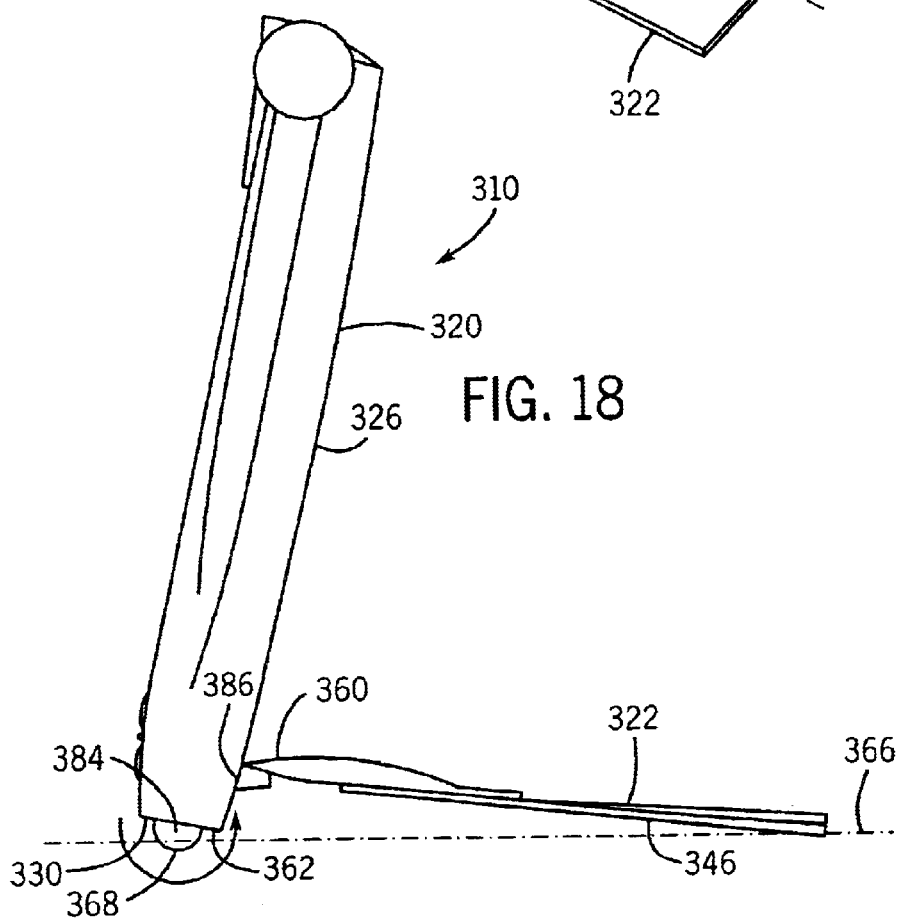

ENCASEMENT FOR HANDHELD COMPUTER

REFERENCE TO RELATED PATENT APPLICATIONS

This application claims the benefit of U.S. Provisional Application No. 60/352,785, filed Jan. 29, 2002, the entirety of which is herein incorporated by reference.

FIELD OF THE INVENTION

The present invention relates to the field of handheld computers and, more particularly, to handheld computers having encasements that can be reconfigured to perform multiple functions. The present invention also relates to a method of repositioning an encasement of a handheld computer to provide multiple functions.

BACKGROUND OF THE INVENTION

Handheld computers, including personal digital assistants ("PDAs") and palm-sized computers, traditionally provide the user with a wide variety of functions, such as a calendar, an address book, a task list, a notepad, and a calculator. More advanced handheld computers also provide the user with functions such as email access, real-time internet access and web browsing.

Most handheld computers, such as the PalmPilot™, Palm III™, Palm V™, and Palm VI™ organizers manufactured by the Palm Corporation, have an outer enclosure or housing consisting of mating front and back shells coupled together by screws. The front and back shells enclose the electronic components of the handheld computer. Handheld computers typically include a display and one or more application buttons accessible on the front of the computer. The display may be a touch-sensitive screen that accepts entry from a stylus or pointer device, which often can be stored in a slot formed in the housing when not in use. The more advanced handheld computers may also include components for enabling advanced functionality.

With most handheld computers, a separate flexible or rigid case is available for protecting the handheld computer, and particularly the display screens, when not in use. These cases must be stored or accounted for when the handheld computer is in use to prevent loss.

With certain handheld computers, a separate case is not required because the encasement or housing includes a hinged cover that can be pivoted from a closed position that protects the display to an open position that allows access to the display. In the most typical arrangements, the cover is hingedly attached to the computer housing by a pair of hinges that allow the cover to pivot 180° to the side of the housing or 360° to the rear of the housing. The 180° pivot arrangement (or book open style) can be disadvantageous when desk space is limited or the computer is being held in the user's hand because the "footprint" of the handheld computer is doubled in this configuration. The 360° pivot arrangement does not have the disadvantage of an increased footprint, however, the heretofore known 360° hinge arrangements are relatively complex multiple linkage structures.

Another common aspect of handheld computers having hinged covers is that the display screens and application buttons typically face directly upward when the computer is placed on a horizontal work surface. At this angle, it can be difficult to operate the computer and view the display screen. To address this problem, it is known to provide a separate stand or cradle that supports the computer housing at an angle relative to the horizontal worksurface. However, the use of a separate cradle is disadvantageous because, like the separate cases, the cradle must be separately accounted for and stored when not in use. In addition, the heretofore known cradles are relatively bulky structures and thus they are cumbersome to transport and store when not in use.

Although some recently designed handheld computers have encasements with hinged covers that can be reconfigured to function as a stand or base to position the computer housing at a desirable working angle, the hinges of these arrangements are relatively complex multi-part structures. Moreover, the hinges typically allow rotation of the cover in very limited ways.

Accordingly, there is a need to provide a handheld computer with an encasement including a hinged cover having a simplified hinge structure that enables the cover to be reconfigured in multiple ways to provide multiple functions.

SUMMARY OF THE INVENTION

An embodiment of the present invention relates to a handheld computer provided with an encasement including a cover that can be reconfigured to multiple different positions for providing multiple different functions.

According to a first aspect of an embodiment of the present invention, a handheld computer comprises a housing and a cover movably connected thereto by a hinge assembly. The hinge assembly enables the cover to be moved to at least three different positions. The cover provides a different function in each position.

According to another aspect of an embodiment of the present invention, a handheld computer comprises a housing and a cover movably connected thereto by a unitary hinge assembly. The unitary hinge assembly enables the cover to be moved to at least two different positions. The cover provides a different function in each position.

According to a further aspect of an embodiment of the present invention, a handheld computer comprises a housing and a cover movably connected thereto by a hinge assembly. The hinge assembly enables the cover to be rotated about at least two different axes.

According to a different aspect of an embodiment of the present invention, a handheld computer comprises a housing, a cover, and means for pivotally coupling the cover to the housing to enable the cover for rotation about at least two different axes.

According to another aspect of an embodiment of the present invention, a method of reconfiguring an encasement of a handheld computer to provide at least two different functions comprises rotating the cover about at least two different axes to move the cover between at least two different positions. The cover provides a different function in each position.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

FIG. 11 is a top plan view of the handheld computer of FIG. 9.

FIG. 12 is a rear perspective view of the handheld computer of FIG. 9.

FIG. 13 is a right side elevation view of the handheld computer of FIG. 9.

FIG. 17 is a rear, right side perspective view of the handheld computer of FIG. 14.

FIG. 18 is a right side elevation view of the handheld computer of FIG. 14.

Figure 1:
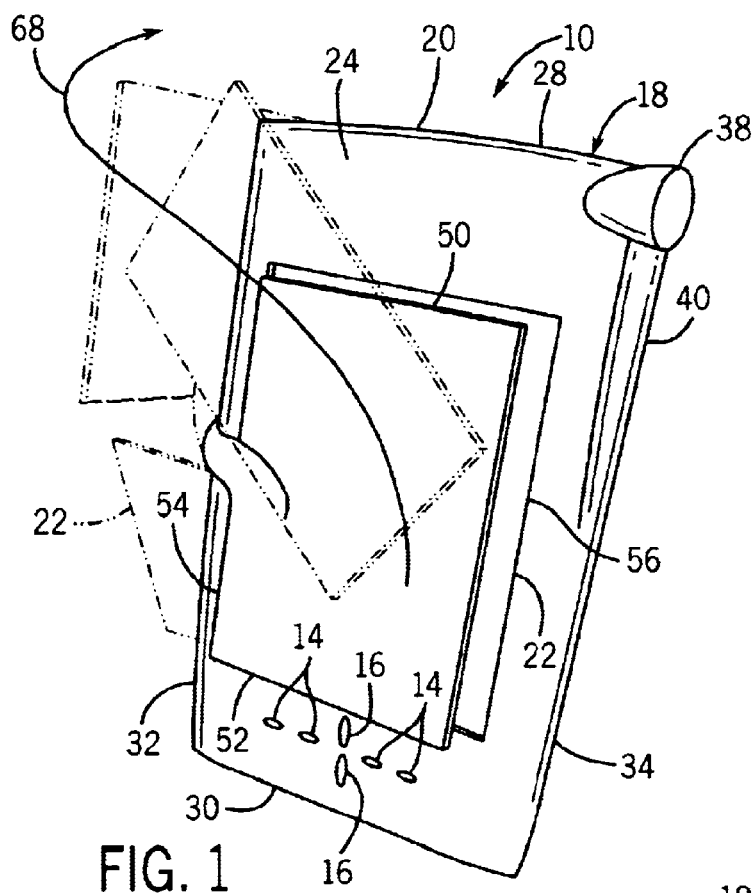
FIG. 1 is a front, right side perspective view of a first embodiment of a handheld computer in accordance with an embodiment of the present invention, the cover being shown in a plurality of positions during transition from a closed position to a stand position.
Figure 2:
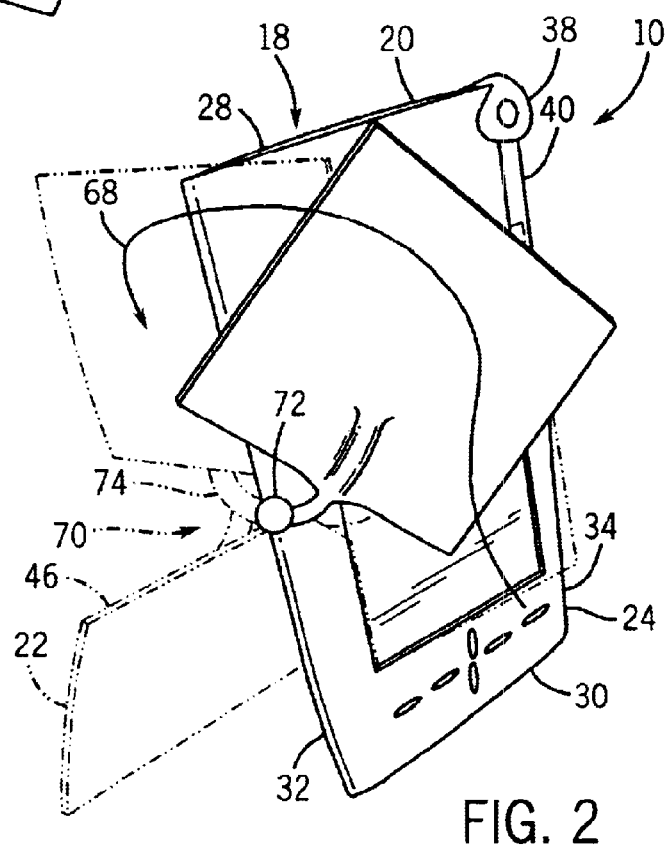
FIG. 2 is a front, left side perspective view of the handheld computer of FIG. 1, the cover being shown in a plurality of positions during transition from a closed position to a stand position.
Figure 3:
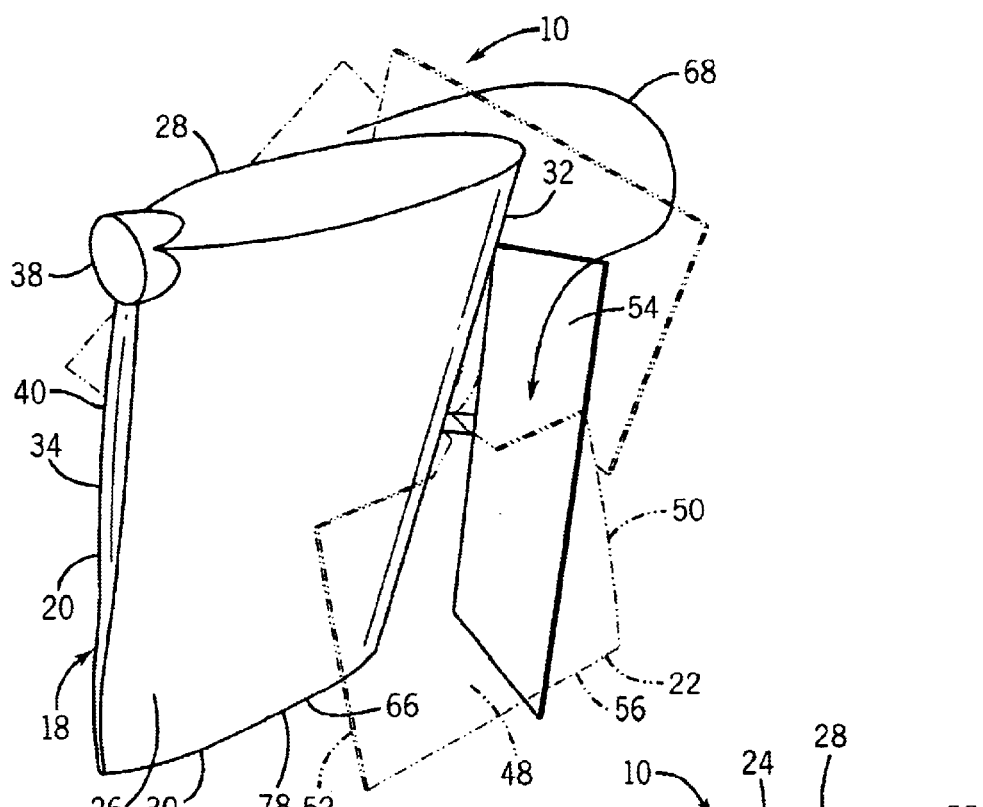
FIG. 3 is a rear, right side perspective view of the handheld computer of FIG. 1, the cover being shown in a plurality of positions during transition from a closed position to a stand position.
Figure 4:
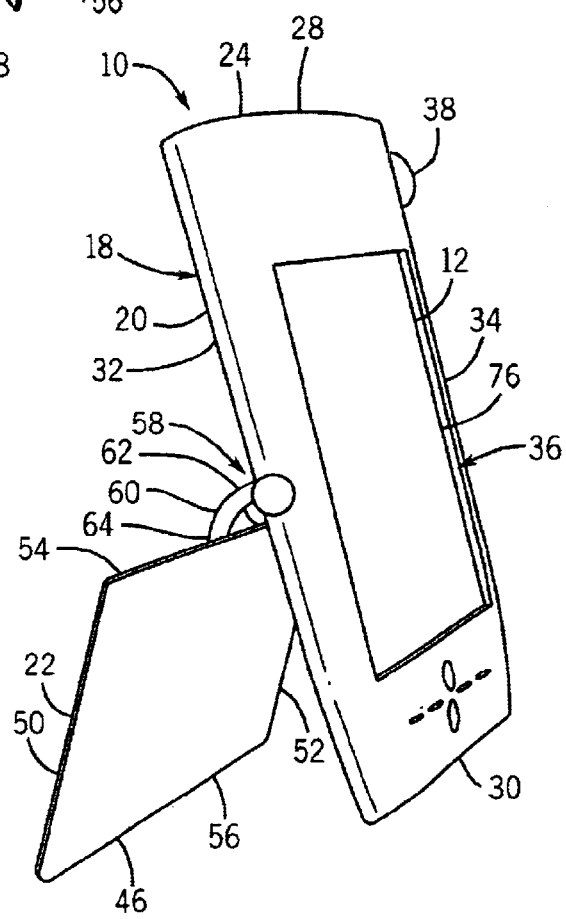
FIG. 4 is a left side perspective view of the handheld computer of FIG. 1, the cover being shown in a stand position that enables the computer housing to remain at an inclined angle relative to a horizontal surface on which it is placed.
Figure 5:
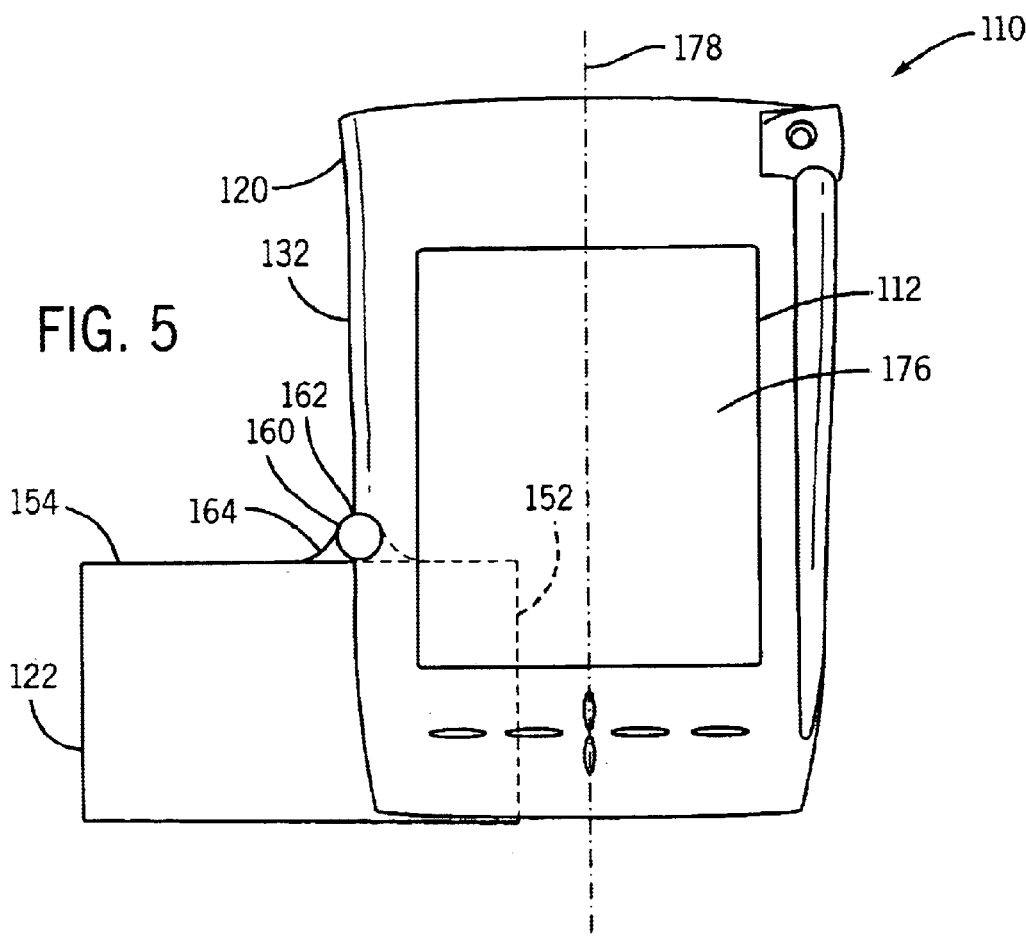
FIG. 5 is a front elevation view of a second embodiment of a handheld computer in accordance with the present invention, the cover being shown in a stand position that enables the computer housing to remain at an inclined angle relative to a horizontal surface on which it is placed.
Figure 6:
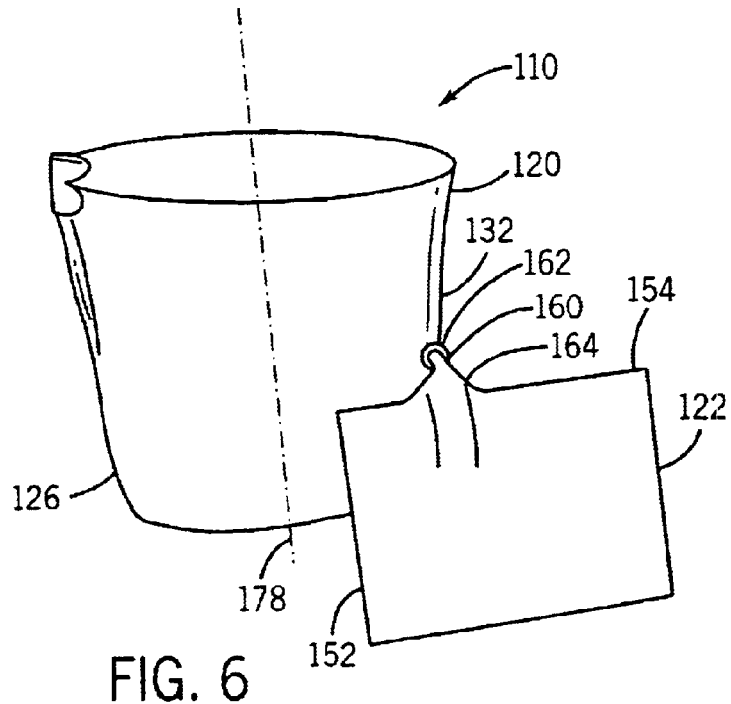
FIG. 6 is a rear perspective view of the handheld computer of FIG. 5.
Figure 7:
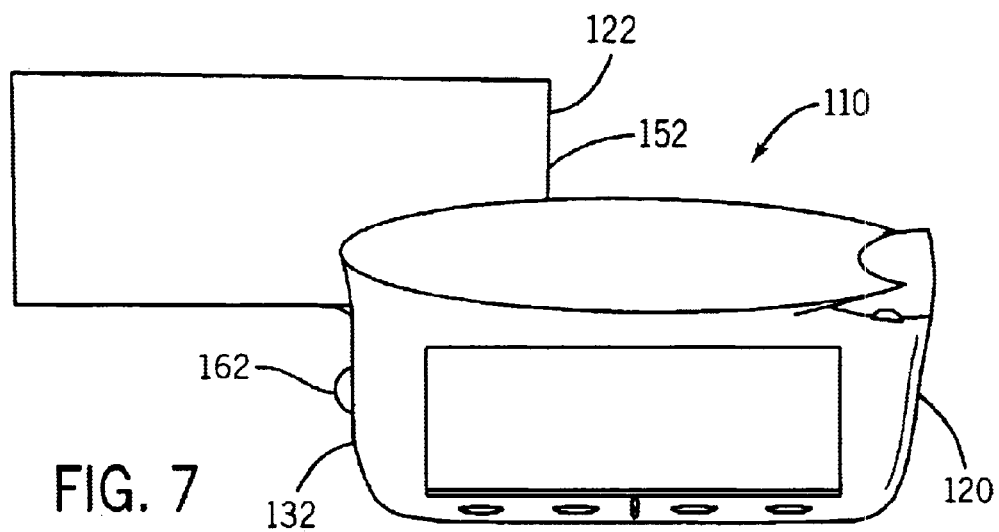
FIG. 7 is a top plan view of the handheld computer of FIG. 5.
Figure 8:
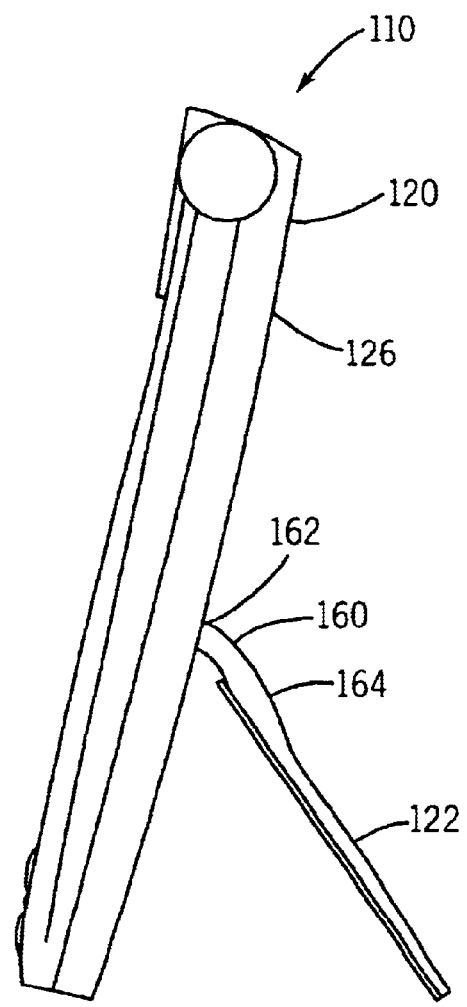
FIG. 8 is a right side elevation view of the handheld computer of FIG. 5.
Figure 9:
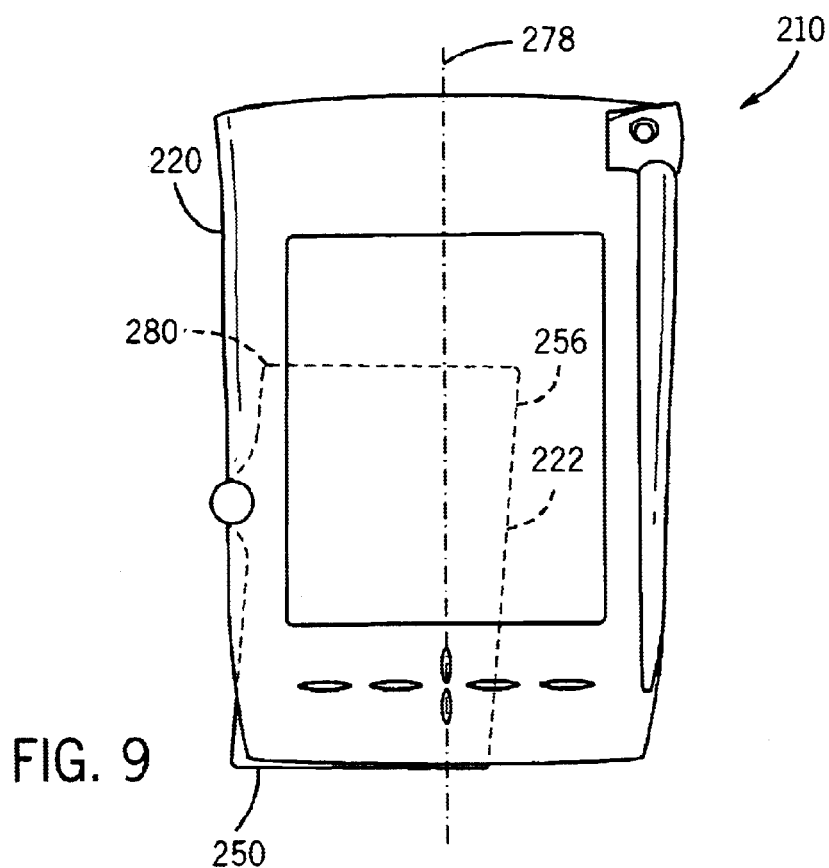
FIG. 9 is a front elevation view of a third embodiment of a handheld computer in accordance with the present invention, the cover being shown in a stand position that enables the computer housing to remain at an inclined angle relative to a horizontal surface on which it is placed.
Figure 10:
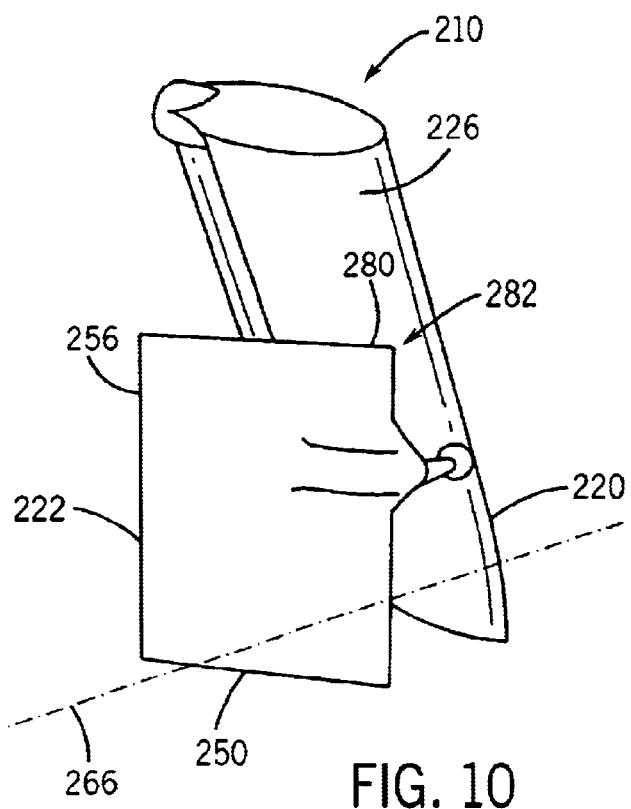
FIG. 10 is a rear, left side perspective view of the handheld computer of FIG. 9.
Figure 14:
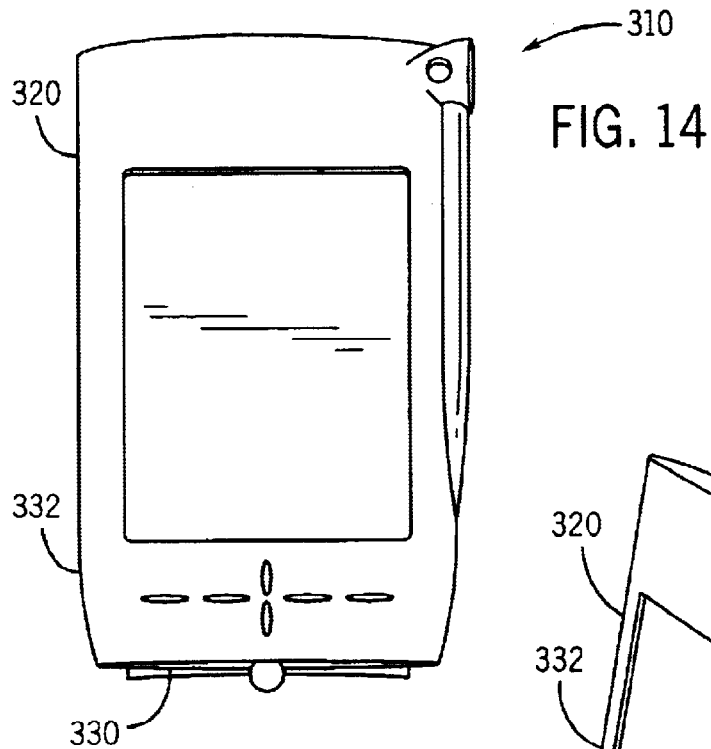
FIG. 14 is a front elevation view of a fourth embodiment of a handheld computer in accordance with the present invention, the cover being shown in a stand position that enables the computer housing to remain at an inclined angle relative to a horizontal surface on which it is placed.
Figure 15:
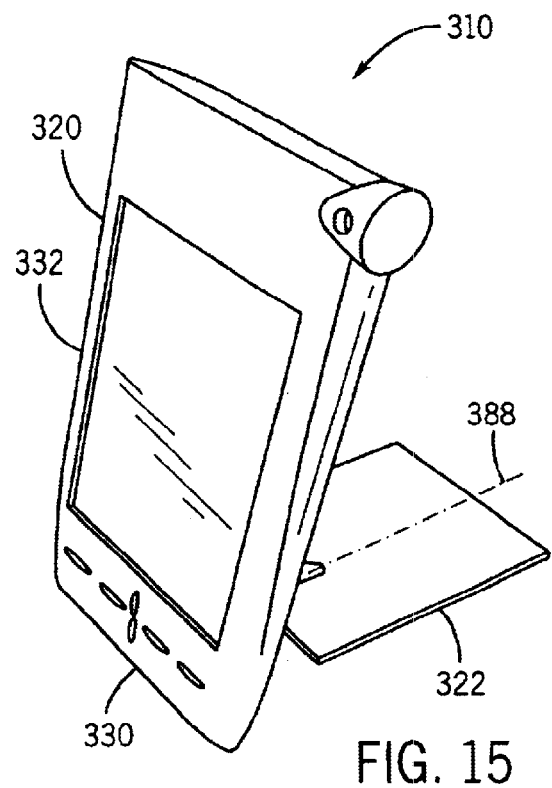
FIG. 15 is a front, right side perspective view of the handheld computer of FIG. 14.
Figure 16:
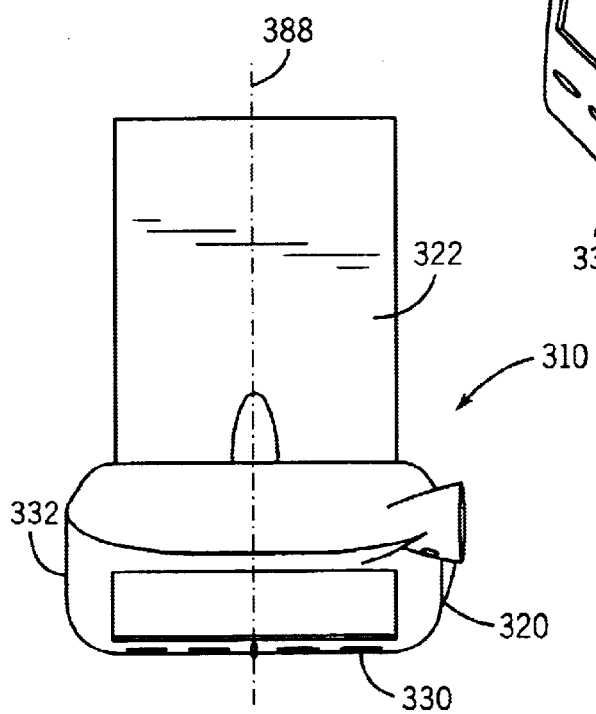
FIG. 16 is a top plan view of the handheld computer of FIG. 14.
Figure 19:
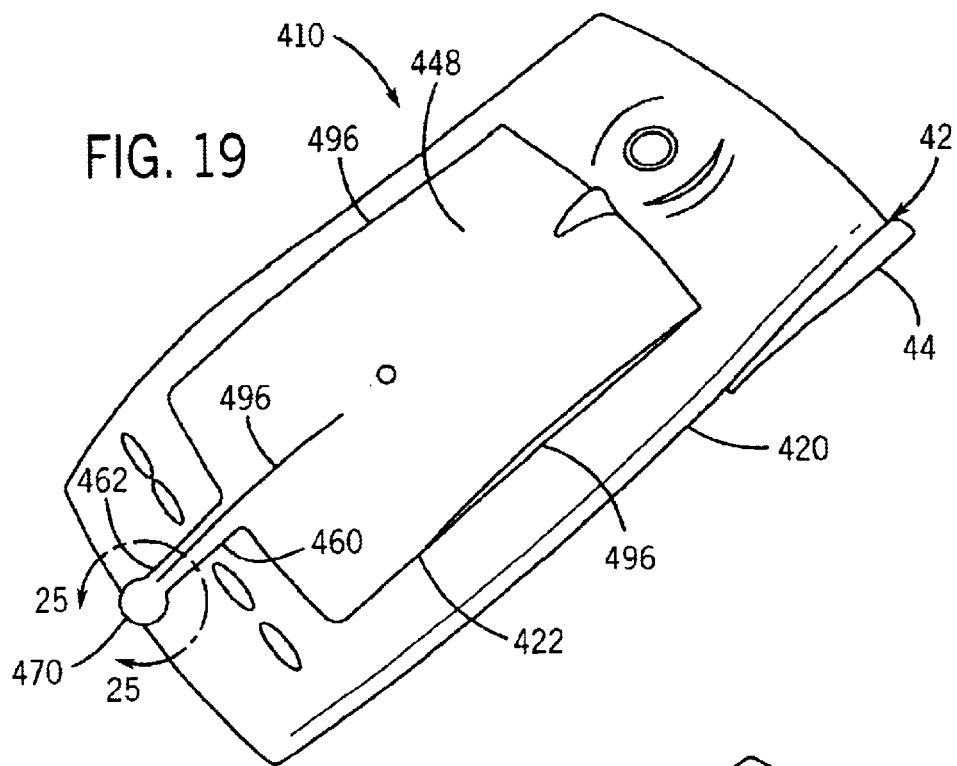
FIG. 19 is a front, right side perspective view of a fifth embodiment of a handheld computer in accordance with the present invention, the cover being shown in a closed position that protects the display screen when not in use.
Figure 20:
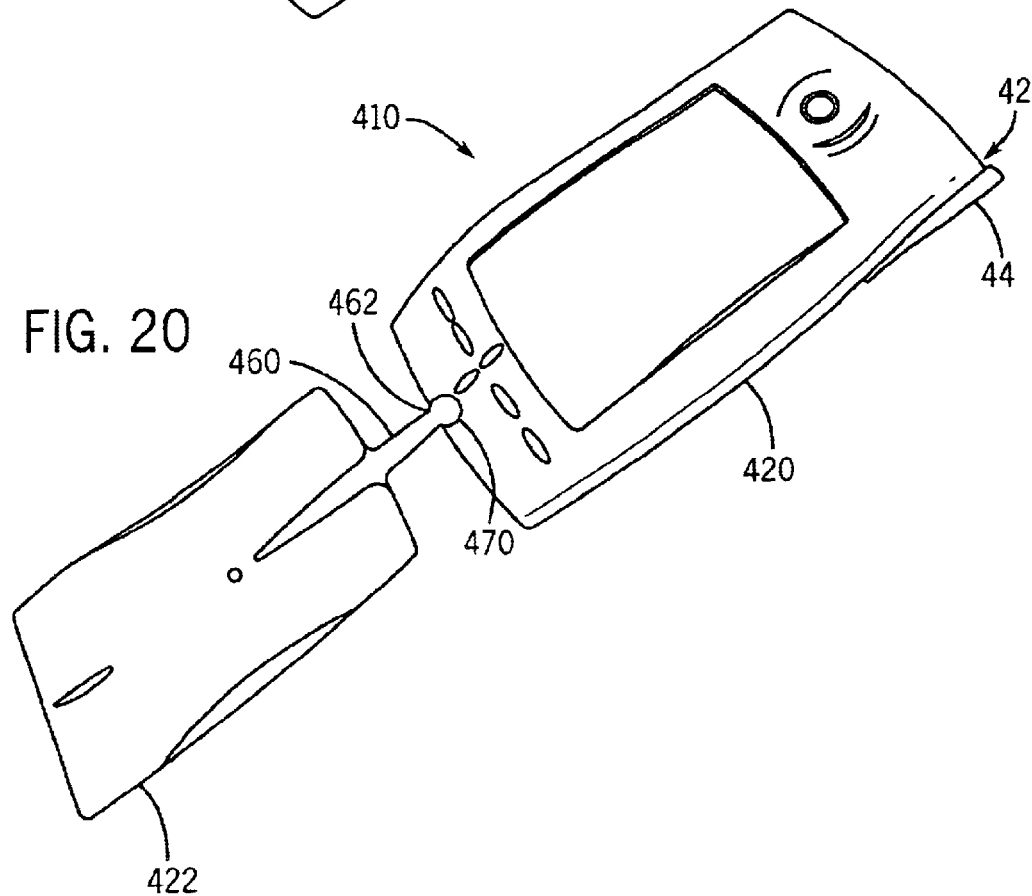
FIG. 20 is a front, right side perspective view of the handheld computer of FIG. 19, the cover being shown during transition from the closed position to an open position.
Figure 21:
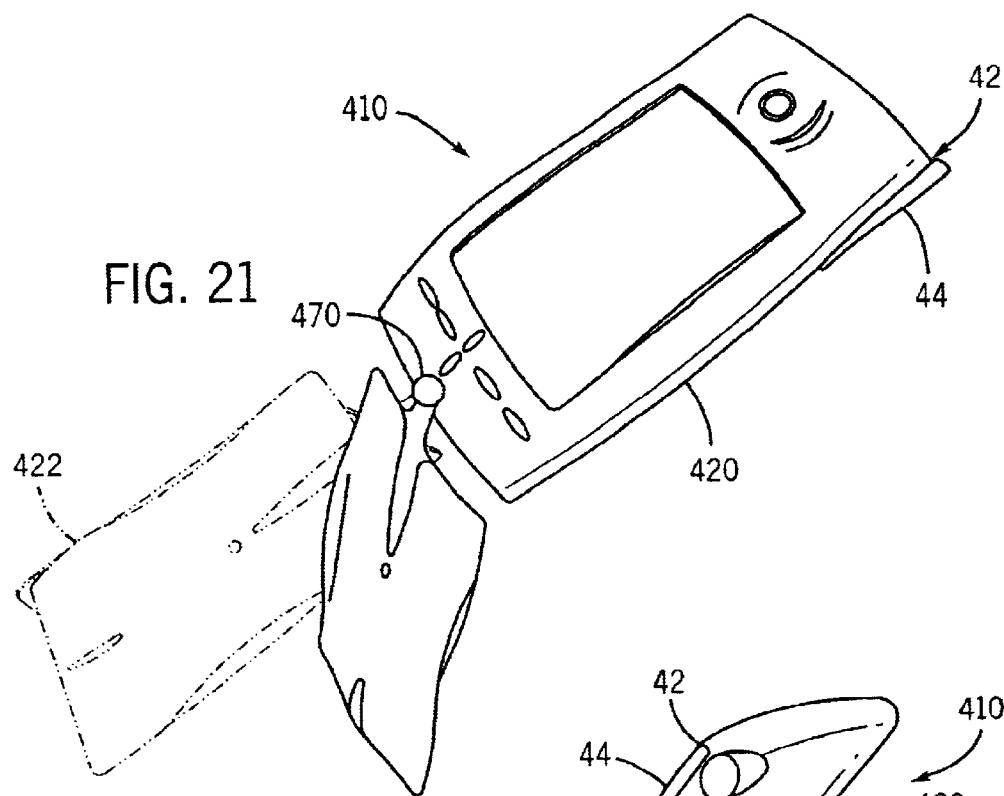
FIG. 21 is a front, right side perspective view of the handheld computer of FIG. 19, the cover being shown in a plurality of positions during transition from a closed position to an open position.
Figure 22:
FIG. 22 is a rear, right side perspective view of the handheld computer of FIG. 19, the cover being shown in a stand position that enables the computer housing to remain at an inclined angle relative to a horizontal surface on which it is placed.
Figure 23:
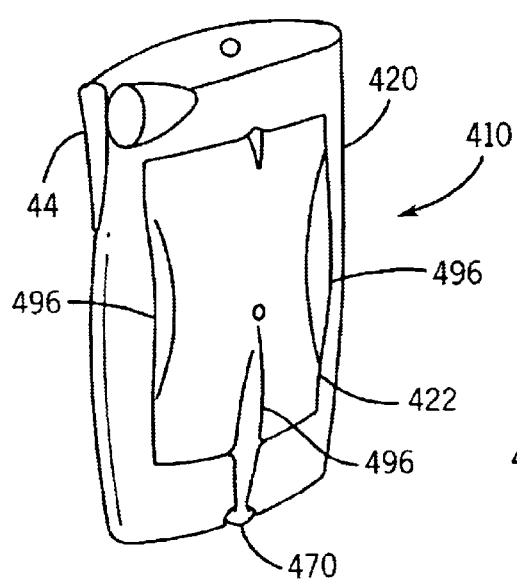
FIG. 23 is a rear, right side elevation view of the handheld computer of FIG. 19, the cover being shown in an open position that allows the computer to lay flat on a horizontal surface or be held in a user's hand.

Before explaining a number of preferred embodiments of the invention in detail, it is to be understood that the invention is not limited in its application to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting. For example, terms such as "front," "back," "top," "bottom," "left," "right," "inner," and "outer" are used for convenience only in referring to the computer elements as oriented in the drawings and not intended to be limiting.

DETAILED DESCRIPTION OF THE PREFERRED EMBODIMENTS

Referring initially to FIGS. 1–4, a portable electronic device, shown as, but not limited to, handheld computer 10 is depicted according to an exemplary embodiment. Handheld computer 10 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 10 includes memory, a processor, and interactive hardware and software that performs functions such as maintaining calendars, phone lists, task lists, notepads, calculator applications, spreadsheets, games, and other applications capable of running on a computing device. Further, handheld computer 10 may be configured for such functions as voice memo recording and play back, as well as communications network connectivity, internet connectivity and wireless telephony.

Handheld computer 10, depicted in FIGS. 1–4, includes a display screen 12 along with a plurality of application buttons 14 and status lights 16, all of which are mounted in an encasement 18.

Encasement 18 comprises a generally rectangular housing 20 and a reconfigurable cover 22 hingedly connected thereto. Housing 20 includes opposed front and rear faces 24 and 26, opposed top and bottom edges 28 and 30, and opposed left and right edges 32 and 34. Front face 24 has a large, generally rectilinear opening 36 which provides visual and physical access to display screen 12. Front face 24 also includes a plurality of smaller openings that allow access to application buttons 14 and status lights 16. An antenna base 38 may be formed on right edge 34 of housing 20 adjacent top edge 28 for pivotally mounting an antenna 40 thereto. Antenna 40 facilitates wireless communication between handheld computer 10 and other portable electronic devices, a base computer, or a network server having a compatible wireless communication protocol such as Bluetooth or IEEE 802.11. Housing 20 may also include expansion card slots, infra red ports, and one or more accessorial slots 42 adapted to receive accessory devices such as a stylus 44 (see FIGS. 19–24).

Returning to FIGS. 1–4, reconfigurable cover 22 is shown as a generally flat, rectilinear plate that is configured to overlie and thus protect display 12 when cover 22 is in a closed position. In this position, cover 22 may also cover some or all of application buttons 14 and/or status lights 16. Cover 22 is defined by opposed inner and outer surfaces 46 and 48, opposed relatively short top and bottom edges 50 and 52, and opposed relatively long left and right side edges 54 and 56.

Cover 22 is pivotally connected to housing 20 by a unitary hinge assembly 58. Hinge assembly 58 comprises a single, generally tubular member or arm 60 having a proximal end 62 secured to left edge 32 of housing 20 and an opposite distal end 64 secured to left edge 54 of cover 22. Proximal end 62 of arm 60 is pivotally coupled to left edge 32 of housing 20 by an arrangement that allows cover 22 to be moved between at least three different positions: a fully closed position, a stand position, and a fully open position. In the closed position, cover 22 overlies display 12 to protect it from damage when computer 10 is not in use. In the stand position (best seen in FIG. 4), cover 22 functions as an outrigger for maintaining housing 20 at an inclined angle relative to a horizontal worksurface 66 on which computer 10 is placed. Starting from the closed position, the stand position may be achieved by flipping cover 22 as shown by arrow 68 in one continuous motion. Hinge assembly 22 may be spring loaded or otherwise biased to facilitate this opening motion. In the fully open position (not illustrated in FIGS. 1–4), cover 22 is located behind computer 10 with inner surface 46 of cover 22 facing toward and closely adjacent or abutting rear face 26 of housing 20.

The pivotal coupling between proximal end 62 of arm 60 and left edge 32 of housing 20 may be provided by a ball and socket arrangement 70 or any joint structure capable of enabling cover 22 to be reconfigured to the multiple positions or orientations described above. Ball and socket arrangement 70 includes a ball 72 formed on proximal end 62 of arm 60 and a mating socket 74 formed in left edge 32 of housing 20. Ball 72 and/or socket 74 may be non-spherically shaped to provide arm 60 (and thus cover 22) with a natural spring bias to one or more of the predefined positions. Additionally or alternatively, ball 72 may have one or more flat spots thereon to provide arm 60 (and thus cover 22) with a tendency to remain in one or more of the predefined positions.

In the illustrated embodiment, distal end 64 of arm 60 is fixedly (i.e., non-rotatably) attached to left edge 54 of cover 22 adjacent the midpoint thereof, and proximal end 62 of arm 60 is pivotally coupled to left edge 32 of housing 20 substantially adjacent a horizontal midline 76 of display 12 and housing 20. With this arrangement, bottom edge 52 of cover 22 lies approximately in the same plane as a vertical midline 78 of rear face 26 of housing 20 when cover 22 is in the stand position (see FIG. 3).

Encasement 18 may be formed of a lightweight and rigid material such as aluminum or a durable plastic, for example, ABS. In a preferred embodiment, housing 20 and cover 22 are made from magnesium. Housing 20 and cover 22 may be cast or machined to the desired configurations.

Referring now to FIGS. 5–8, a second embodiment of a handheld computer 110 is shown. For brevity, the description of handheld computer 110 will be generally limited to its differences relative to handheld computer 10 described above. For convenience, elements of handheld computer 110 that are substantially similar to corresponding elements of handheld computer 10 will be identified by the same reference numerals but preceded by a "1".

Handheld computer 110 differs from handheld computer 10 described above in that proximal end 162 of arm 160 is pivotally coupled to left edge 132 of housing 120 at a location that is substantially below horizontal midline 176 of display 112 and housing 120. In addition, distal end 164 of arm 160 is fixedly coupled to left edge 154 of cover 122 at a lower location than described above for the attachment of arm 60 to cover 22. As a result, bottom edge 152 of cover 122 in the stand position does not lie substantially along vertical midline 178 of rear face 126 of housing 120 (as was the case with computer 10) but instead is offset toward left edge 132 of housing 120. In a preferred embodiment, bottom edge 152 of cover 122 is offset from vertical midline 178 by about 12 mm.

Referring now to FIGS. 9–13, a third embodiment of a handheld computer 210 is shown. For brevity, the description of handheld computer 210 will be generally limited to its differences relative to handheld computer 110 described above. For convenience, elements of handheld computer 210 that are substantially similar to corresponding elements of handheld computer 110 will be identified by the same reference numerals but preceded by a "2" instead of a "1".

Handheld computer 210 differs from handheld computer 110 described above in that cover 222 when in the stand position is in a "portrait" orientation rather than a "landscape" as with cover 122. In particular, cover 222 in the stand position has top edge 250 resting on horizontal support surface 266 and corner 280 engaged with a well or recess 282 formed in rear face 226 of housing 220. With this arrangement, right edge 256 of cover 222 when in the stand position extends beyond vertical midline 278 of rear face 226 of housing 220. In a preferred embodiment, right edge 256 of cover 222 extends beyond vertical midline 278 by about 8 mm.

Referring now to FIGS. 14–18, a fourth embodiment of a handheld computer 310 is shown. For brevity, the description of handheld computer 310 will be generally limited to its differences relative to handheld computer 10 described above. For convenience, elements of handheld computer 310 that are substantially similar to corresponding elements of handheld computer 10 will be identified by the same reference numerals but preceded by a "3".

Handheld computer 310 differs from handheld computer 10 described above in that proximal end 362 of arm 360 is pivotally coupled to the midpoint of bottom edge 330 of housing 320 rather than to the midpoint of left side edge 332 (as with handheld computer 10). As a result, cover 322 in the stand position has its inner surface 346 (rather than one of its edges) in contact with horizontal support surface 366.

In FIG. 18, arrow 368 shows cover 322 being moved from the closed position to the stand position by flipping cover 322 about an axis 384 extending along bottom edge 330 of housing 320. When cover 322 has achieved the position or orientation shown in FIG. 18, the outer curved surface of arm 360 will abut the bottom of a curved groove or channel 386 formed in rear face 326 of housing 320 to prevent any further movement of cover 322 about axis 384 in the direction of arrow 368. Thus, cover 322 in the stand position will function as an outrigger that maintains housing 320 at an inclined angle relative to horizontal surface 366.

To move cover 322 from the stand position shown in FIG. 18 to the fully open position, cover 322 is flipped about axis 384 against the direction of arrow 368 until arm 360 is sufficiently clear of curved groove 386. Once this is done, cover 322 can be rotated 180° about an axis 388 extending through arm 360 so that the inner curved surface of arm 360 is facing toward groove 386 and inner surface 346 of cover 322 is facing toward rear face 326 of housing 320. At this point, cover 322 can again be pivoted in the direction of arrow 368 to bring inner surface 346 of cover 322 into abutting or closely conforming contact with rear face 326 of housing 320. In this position, handheld computer 310 has a sufficiently compact footprint that it can be easily held in a user's hand and requires relatively little space when placed on a worksurface.

Referring now to FIGS. 19–24, a fifth embodiment of a handheld computer 410 is shown. For brevity, the description of handheld computer 410 will be generally limited to its differences relative to handheld computer 310 described above. For convenience, elements of handheld computer 410 that are substantially similar to corresponding elements of handheld computer 310 will be identified by the same reference numerals but preceded by a "4" instead of a "3".

Handheld computer 410 differs from handheld computer 310 described above in that cover 422 is pivotally coupled to housing 420 by a ball and socket arrangement 470 that allows cover 422 to be quickly and easily detached and reattached without the use of tools. Thus, the user can easily personalize computer 410 by substituting designer covers or other objects.

Figure 25:
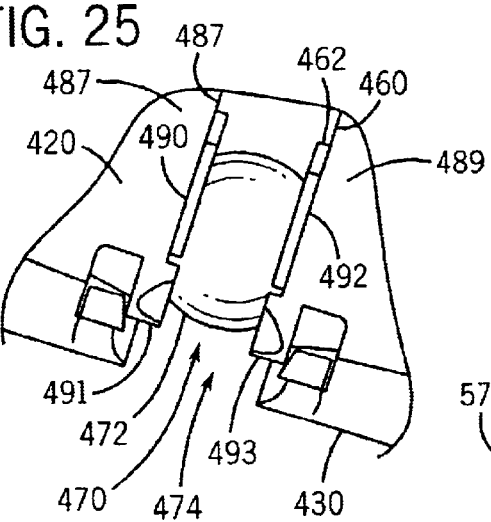
FIG. 25 is an enlarged view of the ball and socket arrangement of the handheld computer of FIG. 19, taken along the line 25—25 in FIG. 19.

As best seen in FIG. 25, ball and socket arrangement 470 includes a generally spherical ball 472 formed on proximal end 462 of arm 460 and a matching socket 474 formed on bottom edge 430 of housing 420. In addition, a pair of pistons or pads 490 and 492 may be mounted in an opposing relationship within socket 474 and biased toward each other by suitable means such as a pair of springs (not shown). If housing 420 is particularly thin or where desired for other purposes, bottom edge 430 of housing 420 may be provided with enlarge ball surrounds 487 and 489 for accommodating pads 490 and 492, respectively, and the associated springs therein. Pads 490 and 492 include inwardly facing concave surfaces designed to match the generally spherical outer surface of ball 472 to ensure that ball 472 remains securely captured therebetween during pivotal movement of cover 422.

With the foregoing structure, cover 422 can be readily detached from housing 420 by simply applying a downward force on cover 422 that is sufficient to cause pads 490 and 492 to spread far enough apart that ball 472 snaps out of engagement with socket 474. Once this occurs, pistons 490 and 492 reconverge toward one another until they either come into abutting contact with each other or some other predefined stop. Cover 422 (or another object) can then be reattached to housing 420 by positioning ball 472 below socket 474 and simply pushing upwardly on cover 422 with sufficient force to cause pistons 490 and 492 to separate far enough apart that ball 472 snaps into place therebetween. This separating operation may be facilitated by providing pads 490 and 492 with ramped surfaces or cams 491 and 493, respectively (see FIG. 25). Once ball 472 has been centered between pistons 490 and 492, the converging spring bias applied to pistons 490 and 492 will cause ball 472 to remain firmly seated in socket 474.

Figure 24:
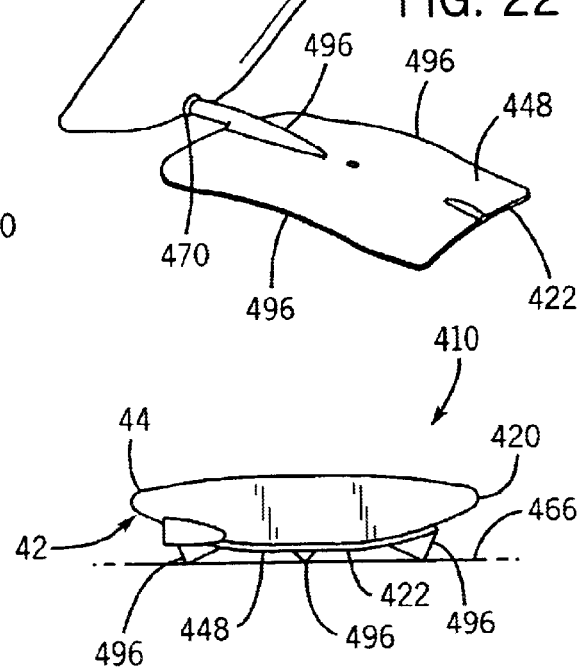
FIG. 24 is an elevation view of the handheld computer of FIG. 19, the cover being shown in the open position of FIG. 23 with the computer resting on a horizontal work surface.

Handheld computer 410 also differs from handheld computer 310 described above in that outer surface 448 of cover 422 has a plurality of flared edges or feet 496. Feet 496 function to stabilize handheld computer 410 when cover 422 is in the fully open position and computer 410 is placed on a flat surface 466 as shown in FIG. 24.

Referring now to FIGS. 26–30, a sixth embodiment of a handheld computer 510 is shown. For brevity, the description of handheld computer 510 will be generally limited to its differences relative to handheld computer 10 described above. For convenience, elements of handheld computer 510 that are substantially similar to corresponding elements of handheld computer 10 will be identified by the same reference numerals but preceded by a "5".

Figure 28:
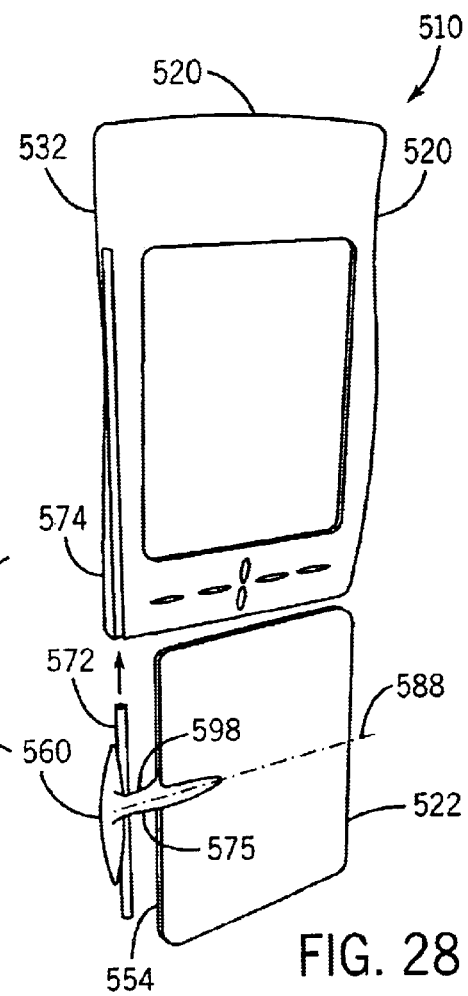
FIG. 28 is an exploded left side perspective view of the handheld computer of FIG. 26.
Figure 29:
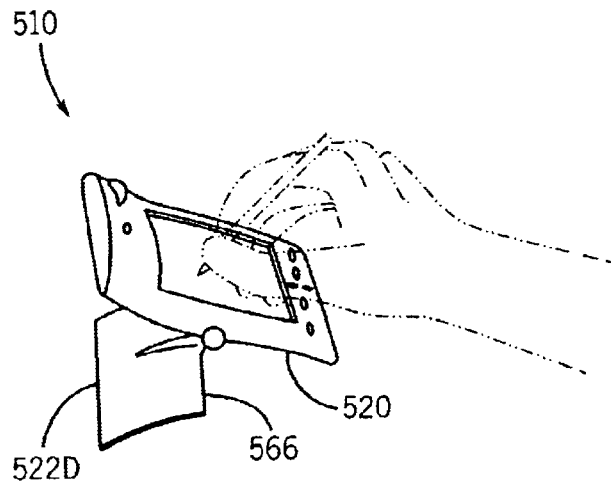
FIG. 29 is a left side perspective view of the handheld computer of FIG. 26, the cover being shown in a stand position that enables the computer housing to remain at a relatively small inclined angle relative to a horizontal surface on which it is placed.
Figure 30:
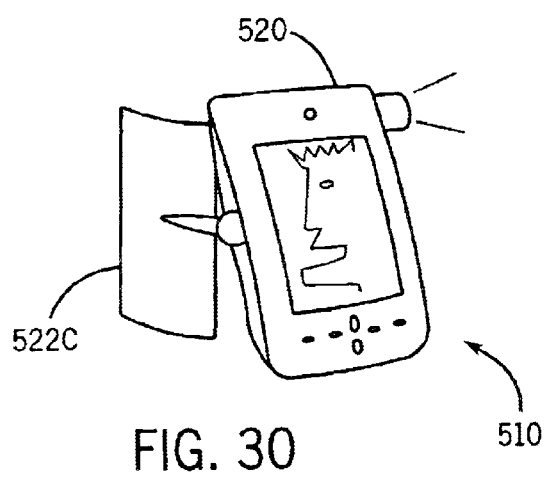
FIG. 30 is a front, left side perspective view of the handheld computer of FIG. 26, the cover being shown in a stand position that enables the computer to remain at a relatively large inclined angle relative to a horizontal surface on which it is placed.
Figure 26:
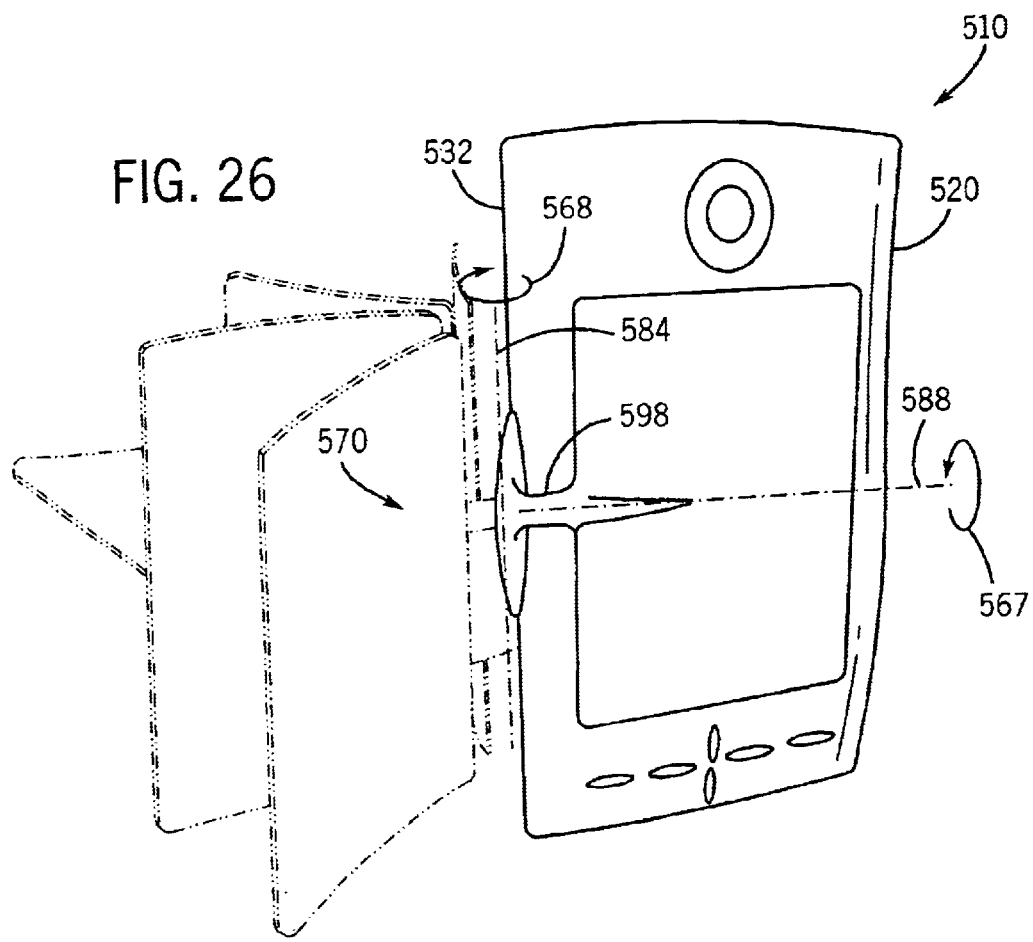
FIG. 26 is a front, left side perspective view of a sixth embodiment of a handheld computer in accordance with the present invention, the cover being shown in a plurality of positions during transition from a closed position to an open position.

Handheld computer 510 differs from handheld computer 10 described above in that cover 522 is pivotally coupled to housing 520 by a detachable hinge arrangement 570 that permits cover 522 to move about two transversely extending axes. As best seen in FIG. 28, detachable hinge arrangement 570 comprises a T-shaped arm 560 having a rod or pin 572 configured for releasable slidable engagement with a slot or groove 574 formed in left edge 532 of housing 520 and a transversely extending base portion 575 secured to left edge 554 of cover 522. Base portion 575 preferably includes a joint 598 that permits rotation of cover 522 about a horizontal axis 588 extending through arm 560 as indicated by arrow 567 in FIG. 26. In addition, hinge 570 permits rotation of cover 522 about a vertical axis 584 extending along left edge 532 of housing 520 as indicated by arrow 568 in FIG. 26.

Figure 27:
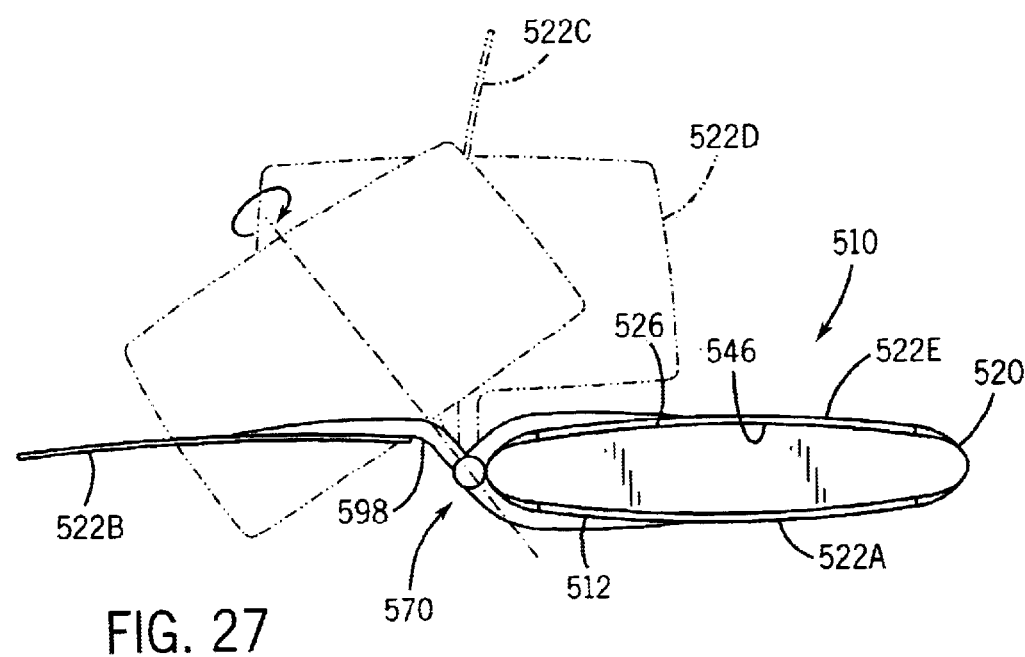
FIG. 27 is a top plan view of the handheld computer of FIG. 26, the cover being shown in a plurality of positions during transition from a closed position to an open position.

With the forgoing structure, cover 522 can be rotated between several different positions to provide various distinct functions. For example, FIG. 27 shows a cover 522A in a closed position for protecting screen 512. In addition, FIG. 27 shows a cover 522B in a book open position for working on a flat surface. Starting from the closed position, the book open position can be achieved by folding the cover 180° outwardly about vertical axis 584. Also in FIG. 27, a cover 522C is shown in a video viewing position in which housing 520 is at a relatively steep angle that is particularly useful for watching video (see also FIG. 30). Starting from the book open position, the video watching position can be achieved by flipping the cover 180° about horizontal axis 588 (as shown by arrow 567 in FIG. 26) and then rotating the cover about vertical axis 584 until cover 522C extends generally perpendicular to housing 520. As another example, FIG. 27 shows a cover 522D in an oblique working angle position in which housing 520 is at a relatively shallow angle relative to a horizontal work surface 566 (see also FIG. 29). Starting from the video viewing position, the oblique working angle position can be achieved by flipping the cover 90° further on horizontal axis 588. Finally, FIG. 27 shows a cover 522E in a fully open position that is particularly useful when computer 510 is to be held in a user's hand or when the worksurface space is at a premium. Starting from the oblique working angle position, the fully open position can be achieved by flipping the cover 90° on horizontal axis 588 and further rotating the cover about vertical axis 584 until inner face 546 is facing toward and substantially flush with rear face 526 of housing 520.

An exemplary embodiment may utilize, be executed by, and/or be applied in a handheld computer including a processor such as but not limited to a Dragonball processor running at clock speeds of 33 MHz, 66 MHz, or other clock speeds, the Dragonball processor being available from Motorola Inc. of Schaumburg, Ill. An exemplary handheld computer may also include, but is not limited to, four (4) megabytes (MB) of flash read only memory (ROM) for storing BIOS information, operating system information, and other information. The flash ROM may be used to store, but is not limited to, any of a number of versions of the Palm operating system (OS) available from Palm, Inc. of Santa Clara, Calif. Further, an exemplary handheld computer may also include, but is not limited to, thirty-two (32) MB of synchronous dynamic random access memory (SDRAM) for storing program information, and other information to be used by the handheld computer. In an alternative embodiment, the handheld computer may also use a digital signal processor including an advanced RISC machine (ARM) processor available from Texas Instruments of Dallas, Tex. and may use, but is not limited to, a Linux based operating system.

It is important to note that the above-described preferred embodiments of the encasements for handheld computers are illustrative only. Although the invention has been described in conjunction with specific embodiments thereof, those skilled in the art will appreciate that numerous modifications are possible without materially departing from the novel teachings and advantages of the subject matter described herein. For example, although the covers are illustrated as being generally rectangular flat plates, the cover could be of other configurations. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A handheld computer, comprising:
   a housing; and
   a cover movably connected to the housing by a hinge assembly that enables the cover to be moved to at least three different positions, the cover providing a different function in each position.

2. The handheld computer of claim 1, wherein the hinge assembly enables the cover to be moved to a closed position, an open position, and a stand position.

3. The handheld computer of claim 2, wherein the cover in the closed position is configured to protect a display screen, the cover in the open position is configured to overly a rear face of the housing for permitting access to the display screen, and the cover in the stand position forms an outrigger for maintaining the housing in an inclined position when placed on a horizontal surface.

4. The hand held computer of claim 2, wherein the cover has an inner surface that faces the display screen when the cover is in the closed position, the inner surface facing a rear face of the housing when the cover is in the open position.

5. The hand held computer of claim 2, wherein the cover has an inner surface that faces the display screen when the cover is in the closed position, the inner surface abutting a horizontal support surface when the cover is in the stand position.

6. The handheld computer of claim 1, wherein the hinge assembly comprises a ball and socket arrangement.

7. The handheld computer claim 6, wherein the ball and socket arrangement allows the cover to be detached and reattached.

8. The handheld computer of claim 6, wherein the ball and socket arrangement includes a ball connected to the cover and a corresponding socket formed in an edge of the housing.

9. The handheld computer of claim 8, further including a pair of pads located within the socket on opposite sides of the ball and biased against the ball.

10. The handheld computer of claim 8, wherein the ball has a non-spherical outer surface.

11. The handheld computer of claim 8, wherein the ball has an outer surface having one or more depressions.

12. The handheld computer of claim 2, wherein the cover in the stand position has a corner that engages a notch formed in a rear face of the housing to allow the housing to remain in an inclined position when placed on a horizontal surface.

13. The handheld computer of claim 1, wherein the hinge assembly comprises a unitary tubular member that is fixedly connected to a first edge of the cover and pivotally connected to a second edge of the housing.

14. The handheld computer of claim 13, wherein the tubular member permits rotation of the cover about two different axes.

15. The handheld computer of claim 14, wherein the tubular member includes a ball and socket arrangement that permits rotation of the cover about a first axis extending along an edge of the housing and a second axis extending through the tubular member.

16. The handheld computer of claim 15, wherein the ball and socket arrangement permits the cover to abut a rear face of the housing when an inner face of the cover is oriented toward the rear face of the housing, the ball and socket arrangement preventing the cover from abutting the rear face of the housing when an outer face of the cover is oriented toward the rear face.

17. A handheld computer, comprising:
    a housing; and
    a cover movably connected to the housing by a unitary hinge assembly that enables the cover to be moved to at least two different positions, the cover providing a different function in each position.

18. The handheld computer of claim 17, wherein the unitary hinge assembly comprises an arm having one end connected to the cover and an opposite end terminating in a ball, the ball being configured to fit within a socket formed in an edge of the housing.

19. The handheld computer of claim 17, wherein the unitary hinge assembly permits the cover to be detached and reattached.

20. The handheld computer of claim 17, wherein the unitary hinge assembly permits the cover to be moved to at least three different positions including a closed position, an open position and a stand position.

21. A handheld computer, comprising:

a housing; and a cover movably connected to the housing by a hinge assembly that enables the cover to be rotated about at least two different axes.

22. The handheld computer of claim 21, wherein the first axis extends along an edge of the housing and the second axis extends transversely to the edge of the housing.

23. The handheld computer of claim 21, wherein the hinge assembly comprises a ball and socket arrangement.

24. The handheld computer of claim 21, wherein the cover is rotatable about two different axes to at least three different positions, the cover providing a different function in each position.

25. The handheld computer of claim 24, wherein the hinge assembly enables the cover to assume a closed position, an open position, and a stand position.

26. The handheld computer of claim 25, wherein the cover in the closed position is configured to protect a display screen, the cover in the open position is configured to permit access to the display screen without increasing a footprint of the computer, and the cover in the stand position forms an outrigger for maintaining the housing in an inclined position when placed on a horizontal surface.

27. A handheld computer, comprising:

a housing;

a cover; and means for pivotally coupling the cover to the housing for rotation about two different axes.

28. The handheld computer of claim 27, wherein the pivotal coupling means comprises a ball and socket arrangement.

29. The handheld computer of claim 27, wherein the pivotal coupling means enables the cover to move between at least two different positions, the cover providing a different function in each position.

30. The handheld computer of claim 27, wherein the pivotal coupling means enables the cover to move between at least three different positions, the cover providing a different function in each position.

31. The handheld computer of claim 30, wherein the pivotal coupling means enables the cover to move between a closed position, an open position, and a stand position.

32. The handheld computer of claim 31, wherein the cover in the closed position is configured to protect a a display screen, the cover in the open position is configured to permit access to the display screen without increasing a footprint of the computer, and the cover in the stand position forms an outrigger for maintaining the housing in an inclined position when placed on a horizontal surface.

33. A method of reconfiguring an encasement of a handheld computer to provide at least two different functions, the encasement including a housing and a cover pivotally connected thereto, the method comprising:

rotating the cover about at least two different axes to move the cover between at least two different positions, the cover providing a different function in each position.

34. The method of claim 33, wherein the cover is pivotally mounted to an edge of the housing, and the rotating step includes rotating the cover about an axis extending generally parallel to the edge of the housing.

35. The method of claim 33, wherein the cover is pivotally mounted to an edge of the housing, and the rotating step includes rotating the cover about an axis extending generally perpendicular to the edge of the housing.

36. The method claim 33, wherein the cover in at least one of the positions functions to protect the display screen from damage.

37. The method of claim 33, wherein the cover in at least one of the positions functions to maintain the housing at an inclined angle relative to a horizontal surface on which the computer is placed.

38. The method of claim 33, wherein the cover in at least one of the positions functions to permit access to the display screen.

39. The method of claim 33, wherein the cover is pivotally connected to the housing by a ball and socket arrangement, and the rotating stop includes rotating the cover about the two different axes in a single continuous motion.

* * * * *

UNITED STATES PATENT AND TRADEMARK OFFICE
CERTIFICATE OF CORRECTION

PATENT NO. : 6,781,824 B2
DATED : August 24, 2004
INVENTOR(S) : John William Krieger and Randall Clark Lewis It is certified that error appears in the above-identified patent and that said Letters Patent is hereby corrected as shown below:

Column 9,
Line 56, following "position" add -- , the hinge enabling rotation of the cover about two orthogonal axes --.

Column 10,
Line 35, following "different" insert -- orthogonal --.
Line 55, following "position" insert -- , the hinge enabling rotation of the cover about two orthogonal axes --.

Column 11,
Lines 5 and 29, following "different" insert -- orthogonal --.

Column 12,
Line 5, following "protect" delete "a", first occurrence.
Line 38, following "rotating", first occurrence, delete "stop" and substitute -- step --.

Signed and Sealed this

Eighth Day of February, 2005

JON W. DUDAS
*Director of the United States Patent and Trademark Office*